United States Patent [19]

Nakamura

[11] Patent Number: 5,412,204
[45] Date of Patent: May 2, 1995

[54] METHOD FOR DETECTING AN OUTPUT OF A GYROSCOPE WITH DUAL SYNCHRONIZED DETECTION CIRCUIT AND DUAL SMOOTHING CIRCUIT

[75] Inventor: Takeshi Nakamura, Nagaokakyo, Japan

[73] Assignee: Murata Manufacturing Co., Ltd., Nagaokakyo, Japan

[21] Appl. No.: 197,869

[22] Filed: Feb. 17, 1994

[30] Foreign Application Priority Data

Feb. 22, 1993 [JP] Japan .................................. 5-094813
Mar. 19, 1993 [JP] Japan .................................. 5-085711

[51] Int. Cl.[6] .................................................. G01D 5/34
[52] U.S. Cl. ................................ 250/231.12; 73/505; 310/316
[58] Field of Search ...................... 250/231.12, 231.16, 250/231.18; 73/505, 504, 496; 310/316, 320, 353

[56] References Cited

U.S. PATENT DOCUMENTS 5,272,922  12/1993  Watson ................................. 73/505
5,349,857  9/1994   Kasanami et al. .................... 73/505

Primary Examiner—David C. Nelms
Assistant Examiner—Que T. Le
Attorney, Agent, or Firm—Nikaido, Marmelstein, Murray & Oram

[57] ABSTRACT

Two piezoelectric elements (16a), (16b) for detecting of a vibratory gyroscope (12) are connected to a first differential amplifier circuit (38) and a summing circuit (46). An output of the first differential amplifier circuit (38) is detected in synchronous with a feedback signal of the vibratory gyroscope (12) by a first synchronized detection circuit (40), and further smoothed by a first smoothing circuit (44). The output signal of the first differential amplifier circuit (38) is detected in synchronous with an output signal of a phase correction circuit (48) by a second synchronized detection circuit (42), and further smoothed by a second smoothing circuit (50). By a level adjusting circuit (52), it is adjusted that a drift component of an output signal of the first smoothing circuit (44) and a drift component of an output signal of the second smoothing circuit (50) are the same level. A difference between the output signal of the first smoothing circuit (44) and an the output signal of the level adjusting circuit (52) is obtained by a second differential amplifier circuit (54). Furthermore, the output signal of the first differential amplifier circuit (38) may be detected in synchronous with an output signal of the summing circuit (46), smoothed and applied to the level adjusting circuit (52).

6 Claims, 9 Drawing Sheets

OUTPUT SIGNAL OF PIEZOELECTRIC ELEMENT 16a

OUTPUT SIGNAL OF PIEZOELECTRIC ELEMENT 16b

FEEDBACK SIGNAL

OUTPUT SIGNAL OF FIRST DIFFERENTIAL AMPLIFIER CIRCUIT 38

(CORIOLIS SIGNAL, COMPOSITE SIGNAL, DRIFT SIGNAL)

OUTPUT SIGNAL OF SUMMING CIRCUIT 46

F I G. 7
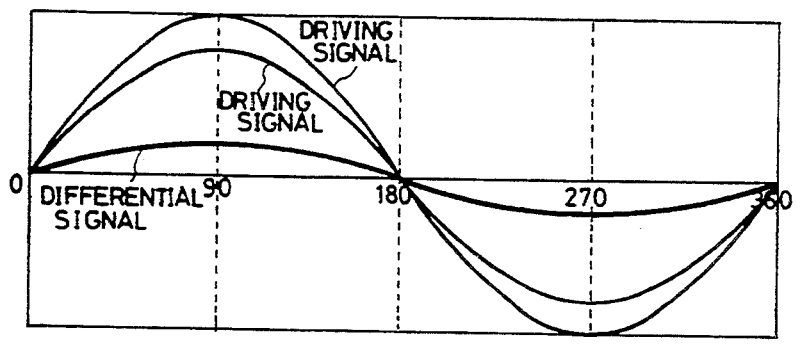
F I G. 8
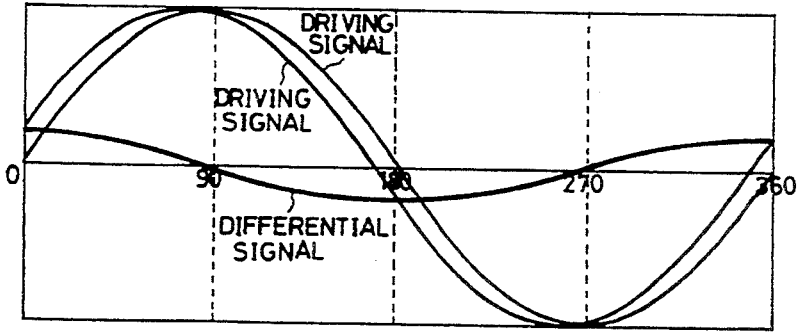

F I G. 9
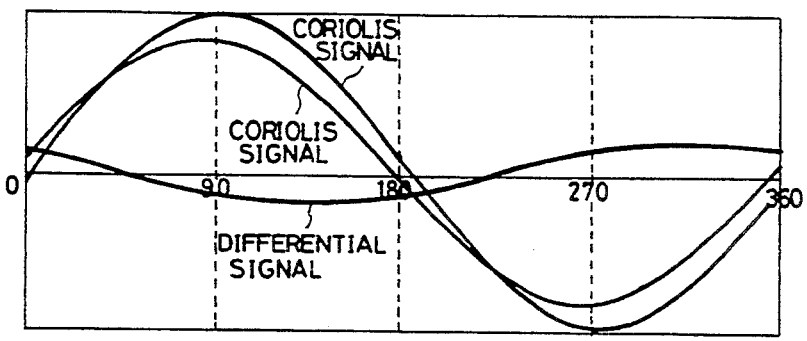
TWO CORIOLIS SIGNALS AND DIFFERENTIAL SIGNAL
F I G. 10
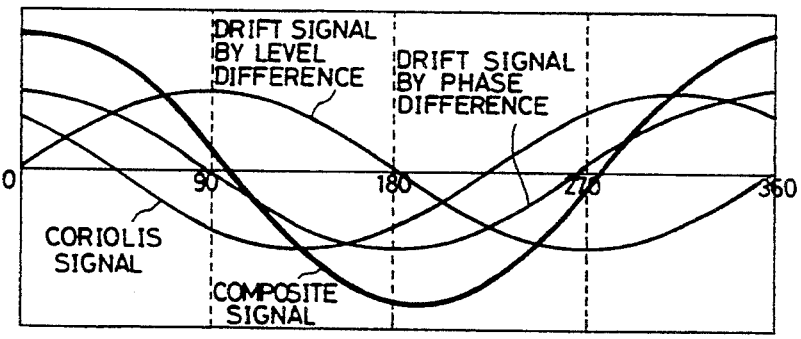
OUTPUT SIGNAL OF FIRST DIFFERENTIAL AMPLIFIER CIRCUIT 38

METHOD FOR DETECTING AN OUTPUT OF A GYROSCOPE WITH DUAL SYNCHRONIZED DETECTION CIRCUIT AND DUAL SMOOTHING CIRCUIT

BACKGROUND OF THE INVENTION

Field of the Invention

The present invention relates to a method for detecting an output of a gyroscope, more particularly to a method for detecting an output of, for example, a prism-shaped vibratory gyroscope used a bending vibration.
Description of the Prior Art FIG. 14 is a block diagram showing an example of a detecting circuit used in a conventional method for detecting an output of a gyroscope which is a background of the present invention. The detecting circuit 1 is used for measuring an output of, for example, a triangular prism-shaped vibratory gyroscope 2.

Between two piezoelectric elements 3 and other piezoelectric element 4 of the vibratory gyroscope 2, an oscillation circuit 5 is connected. The oscillation circuit 5 is connected to the piezoelectric elements 3 via resistors 6. Outputs of the piezoelectric elements 3 are applied to a differential circuit 7. An output of the differential circuit 7 is synchronously detected by a synchronized detection circuit 8. The detected signal is amplified by a DC amplifier circuit 9.

By the oscillation circuit 5, the vibratory gyroscope 2 bends and vibrates in the direction perpendicular to the surface whereon the piezoelectric element 4 is formed. In this state, when the vibratory gyroscope 2 is rotated about its axis, the direction of the bending vibration is changed by a Coriolis force. Thereby, a difference of outputs is generated between two piezoelectric elements 3 used as detecting members, an output is obtained from the differential circuit 7. In this case, driving signals for driving the vibratory gyroscope 2 are the same phase and in the same level at two piezoelectric elements 3. Thus, the signals for driving the vibratory gyroscope 2 are offset by the differential circuit 7. Therefore, only a signal corresponding to the magnitude of the rotational angular velocity is obtained from the differential circuit 7. Accordingly, by measuring an output wherein the output of the differential circuit 7 is synchronously detected and DC amplified, the rotational angular velocity applied to the vibratory gyroscope 2 can be measured.

However, by changing the atmospheric temperature and so on, a phase difference is generated between the outputs of the piezoelectric elements for detecting, the phase difference causes to drift. When the phase difference is generated between the outputs of the piezoelectric elements for detecting, since the output of the differential circuit is obtained with the phase difference of about 90 degree against the inputs of the differential circuit, the output of the differential circuit 7 is approximately equivalent in phase to the output signal generated by the Coriolis force depending on the rotational angular velocity. Thus, it is hardly to distinguish the signal by the Coriolis force from the signal by the phase difference between the outputs of the piezoelectric elements, the offset drift is changed by changing the temperature.

Also, by changing the atmospheric temperature and so on, there is a case wherein a level difference is generated between the outputs of the piezoelectric elements for detecting. In such a case, a level difference between the driving signals is obtained from the differential circuit, the level difference causes to drift.

SUMMARY OF THE INVENTION

It is therefore a primary object of the present invention to provide a method for detecting an output of a gyroscope which can eliminate a drift component by a phase difference between two detecting members.

It is another object of the present invention to provide a method for detecting an output of a gyroscope which can eliminate a drift component by a phase difference and a drift component by a level difference between two detecting members.

The present invention is a method for detecting an output of a gyroscope for measuring an output of a vibratory gyroscope including a prism-shaped vibrating body and two detecting members formed on a surface of said vibrating body comprising a step for detecting a difference between output signals of the two detecting members by a differential circuit, a step for detecting a sum of the output signals of the two detecting members by a summing circuit, a step for shifting an output signal of the summing circuit by 90 degree by a phase correction circuit, a step for detecting an output signal of the differential circuit in synchronous with a Coriolis detecting signal of the vibratory gyroscope by a first synchronized detection circuit, a step for detecting the output signal of the differential circuit in synchronous with an output signal of the phase correction circuit by a second synchronized detection circuit, a step for smoothing an output signal of the first synchronized detection circuit by a first smoothing circuit, a step for smoothing an output signal of the second synchronized detection circuit by a second smoothing circuit, and a step for eliminating a drift component by composing an output signal of the first smoothing circuit and an output signal of the second smoothing circuit with adjusting a level thereof.

Also, the present invention is a method for detecting an output of a gyroscope for measuring an output of a vibratory gyroscope including a prism-shaped vibrating body and two detecting members formed on a surface of the vibrating body comprising a step for detecting a difference between output signals of the two detecting members by a differential circuit, a step for detecting a sum of the output signals of the two detecting members by a summing circuit, a step for shifting an output signal of the summing circuit by 90 degree by a phase correction circuit, a step for detecting an output signal of the differential circuit in synchronous with a Coriolis detecting signal of the vibratory gyroscope by a first synchronized detection circuit, a step for detecting the output signal of the differential circuit in synchronous with an output signal of the phase correction circuit by a second synchronized detection circuit, a step for detecting the output signal of the differential circuit in synchronous with the output signal of the summing circuit by a third synchronized detection circuit, a step for smoothing an output signal of the first synchronized detection circuit by a first smoothing circuit, a step for smoothing an output signal of the second synchronized detection circuit by a second smoothing circuit, a step for smoothing an output signal of the third synchronized detection circuit by a third smoothing circuit, and a step for eliminating a drift component by composing an output signal of the first smoothing circuit, output signals of the second smoothing circuit and the third smoothing circuit with adjusting levels thereof.

When a phase difference is generated between the output signals of the two detecting members, by detecting the difference between the output signals of the two detecting members, by detecting in synchronous with the Coriolis detecting signal of the vibratory gyroscope, and by smoothing, the signal by the Coriolis force is obtained from the first smoothing circuit without being offset. The drift component is obtained partly offset by giving a phase difference between the drift component and the signal by the Coriolis force. Also, by detecting the output signal of the differential circuit in synchronous with the signal shifted the output of the summing circuit, and by smoothing, the drift component is obtained from the second smoothing circuit without being offset. The signal by the Coriolis force is obtained partly offset. Thus, when two signals synchronously detected are adjusted in level and composed so as to eliminate the drift component, only the signal by the Coriolis force can be taken out.

When a level difference is generated between the driving signals, the output signal from the first smoothing circuit includes a drift component by the level difference, too. The drift component by the level difference is obtained partly offset. Meanwhile, the drift component by the level difference is offset and is not obtained from the second smoothing circuit. Furthermore, by detecting the output signal of the differential circuit in synchronous with the output signal of the summing circuit, and by smoothing, the drift component by the level difference is obtained from the third smoothing circuit without being offset. The signal by the Coriolis force is obtained partly offset. In this case, the drift component by the phase difference is offset and is not obtained. Thus, when three signals synchronously detected are adjusted in level and composed so as to eliminate the drift component by the phase difference and the drift component by the level difference, only the signal by the Coriolis force can be taken out.

According to the present invention, even if the phase difference is generated between the driving signals of the two detecting members as the drift component by changing the atmospheric temperature and so on, since the drift component can be eliminated, the rotational angular velocity can be detected accurately. Furthermore, even if the level difference is generated between the driving signals on the two detecting members, the drift component by the phase difference and the drift component by the level difference can be eliminated by three synchronized detections.

The above and other objects, features, aspects and advantages of the present invention will become more apparent from the following detailed description of the embodiments with reference to the accompanying drawings.

BRIEF DESCRIPTION OF THE DRAWINGS

FIG. 7 is a wave form diagram showing a differential signal between driving signals having a level difference.

FIG. 8 is a wave form diagram showing a differential signal between driving signals having a phase difference.

FIG. 9 is a wave form diagram showing a differential signal between Coriolis signals.

FIG. 10 is a wave form diagram showing an output signal of the first differential amplifier circuit.

DESCRIPTION OF THE PREFERRED EMBODIMENTS

Figure 1:
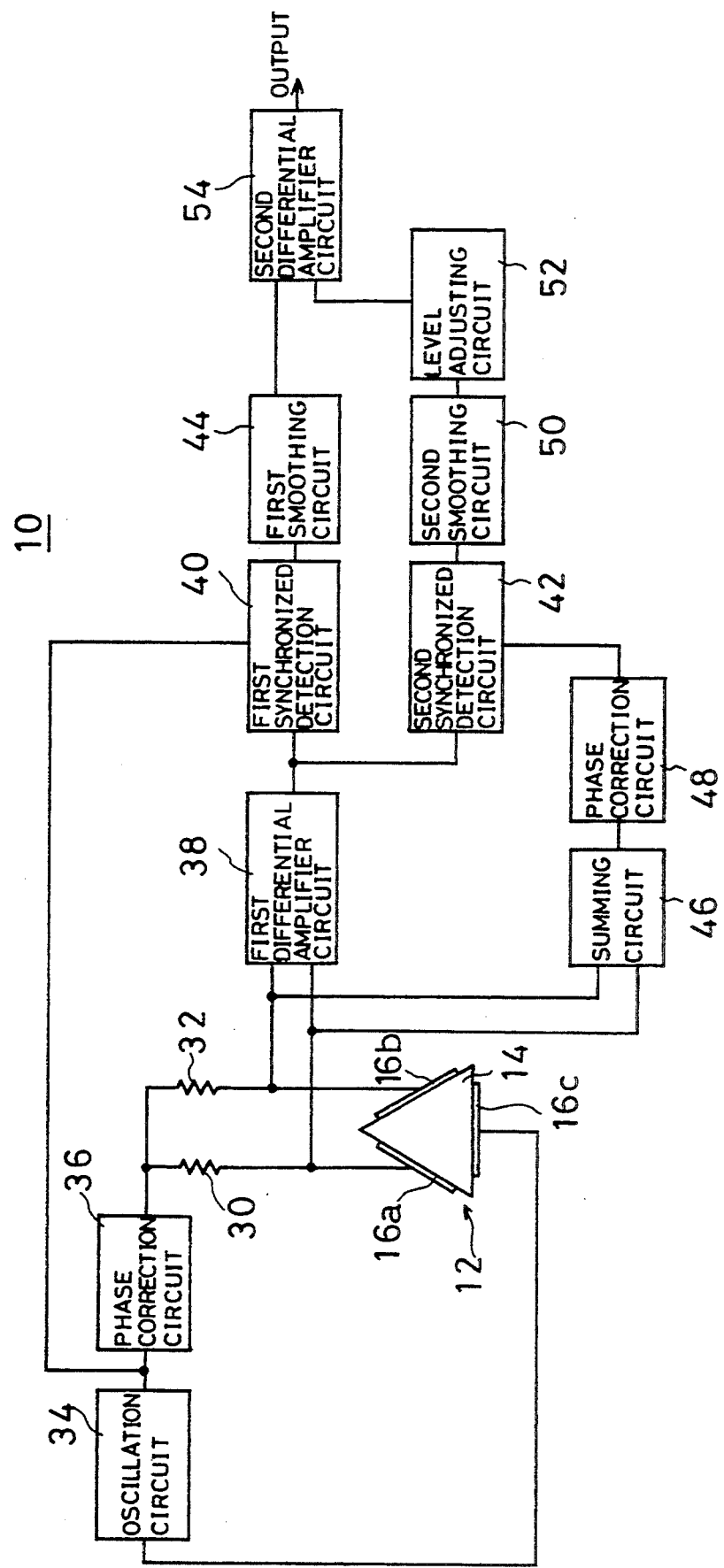
FIG. 1 is a block diagram showing an example of a detecting circuit used in a method for detecting an output of a gyroscope according to the present invention.
Figure 2A:
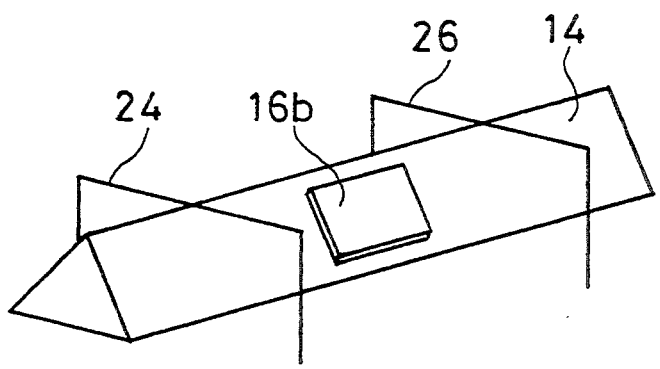
FIG. 2(A) is a perspective view showing an example of a vibratory gyroscope detected by the detecting circuit shown in FIG. 1.
Figure 2B:
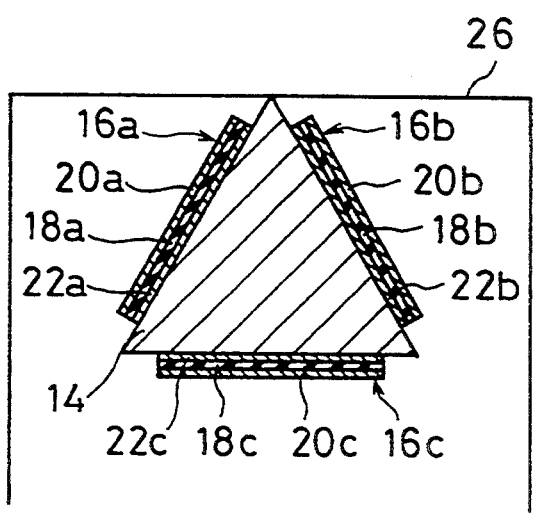
FIG. 2(B) is a sectional view thereof.

FIG. 1 is a block diagram showing an example of a detecting circuit used in a method for detecting an output of a gyroscope according to the present invention. The detecting circuit 10 is used for detecting an output of, for example, a vibratory gyroscope 12. As shown in FIG. 2(A) and FIG. 2(B), the vibratory gyroscope 12 includes, for example, a regular triangular prism-shaped vibrating body 14. The vibrating body 14 is formed with a material which generally generates a mechanical vibration such as elinver, iron-nickel alloy, quartz, glass, crystal, ceramic and the like.

At the center portions of three side faces of the vibrating body 14, piezoelectric elements 16a, 16b and 16c are formed respectively. The piezoelectric element 16a includes a piezoelectric layer 18a consisting of, for example, piezoelectric ceramics, and on both surfaces of the piezoelectric layer 18a, electrodes 20a, 22a are formed. The electrode 22a is bonded to the side face of the vibrating body 14. Similarly, the piezoelectric elements 16b, 16c include piezoelectric layers 18b, 18c, and on both surfaces thereof, electrodes 20b, 22b, 20c and 22c are formed. The electrodes 22b, 22c of the piezoelectric elements 16b, 16c are bonded to the side faces of the vibrating body 14. Furthermore, the vibrating body 14 is supported by supporting members 24 and 26 consisting of, for example, a metal wire at the vicinities of the nodal points of the vibrating body 14. The supporting members 24 and 26 are secured to the vicinities of the nodal points of the vibrating body 14 by, for example, welding.

Between the piezoelectric elements 16a, 16a and the piezoelectric element 16c, an oscillation circuit 34 and a phase correction circuit 36 are connected via resistors 30, 32. The piezoelectric elements 16a, 16b are used as driving for bending and vibrating the vibratory gyroscope 12 and also used as detecting members for detecting a signal corresponding to a rotational angular velocity. The piezoelectric element 16c is used as feedback for detecting an amplitude of a vibration of the vibratory gyroscope 12 and for continuing a bending vibration thereof.

The piezoelectric elements 16a, 16b are connected to a first differential amplifier 38, a difference between output signals of the piezoelectric elements 16a, 16b is detected. Furthermore, the first differential amplifier circuit 38 is connected to a first synchronized detection circuit 40 and a second synchronized detection circuit 42. By the first synchronized detection circuit 40, an output signal of the first differential amplifier circuit 38 is detected in synchronous with a Coriolis detecting signal of the vibratory gyroscope 12 that is a feedback signal or with a signal corrected a phase of the Coriolis detecting signal. An output signal of the first synchronized detection circuit 40 is smoothed by the first smoothing circuit 44.

The piezoelectric elements 16a, 16b are connected to a summing circuit 46, a sum of the output signals of the piezoelectric element 16a, 16b is detected. Furthermore, the summing circuit 46 is connected to a phase correction circuit 48, a signal from the summing circuit 46 is corrected in phase and a synchronizing signal for synchronously detecting by the second synchronized detection circuit 42 is obtained. By the second synchronized detection circuit 42, the output signal of the first differential amplifier circuit 38 is detected in synchronous with the synchronizing signal from the phase correction circuit 48. An output signal of the second synchronized detection circuit 42 is smoothed by a second smoothing circuit 50.

An output signal of the second smoothing circuit 50 is applied to a level adjusting circuit 52. An output signal of the first smoothing circuit 44 and an output signal of the level adjusting circuit 52 are applied to a second differential amplifier circuit 54. By the second differential amplifier circuit 54, the output signal of the first smoothing circuit 44 and the output signal of the level adjusting circuit 52 are composed differentially. In this case, the level adjusting circuit 52 is adjusted so that the drift component included in the output signal of the first smoothing circuit 44 and the drift component included in the output signal of the second smoothing circuit 50 are the same level. Thus, only the Coriolis signal by the Coriolis force is obtained from the second differential amplifier circuit 54.

In the vibratory gyroscope 12, by the oscillation circuit 34 and the phase correction circuit 36, the vibrating body 14 bends and vibrates in the direction perpendicular to the surface whereon the piezoelectric element 16c is formed. In this state, when the vibrating body 14 is rotated about its axis, the direction of the bending vibration is changed by a Coriolis force. Thereby, a difference is generated between the output signals of the piezoelectric elements 16a and 16b. Thus, by measuring the difference between the output signals of the piezoelectric elements 16a and 16b, the rotational angular velocity applied to the vibratory gyroscope 12 can be detected.

Figure 3:
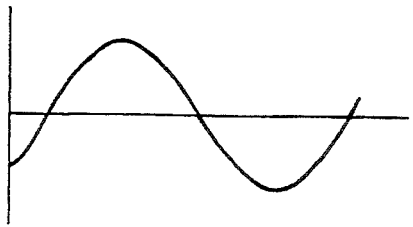
FIG. 3 is a wave form diagram showing signals of respective portions of the detecting circuit shown in FIG. 1.
Figure 3:
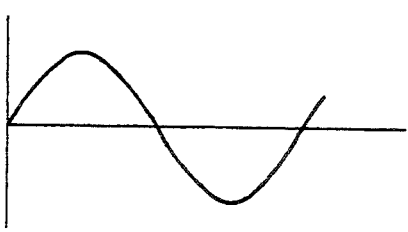
Figure 3:
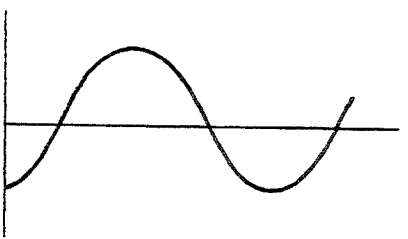
Figure 3:
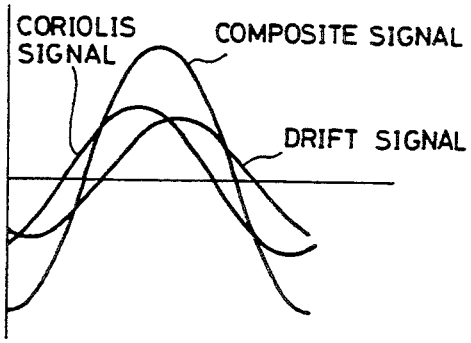
Figure 3:
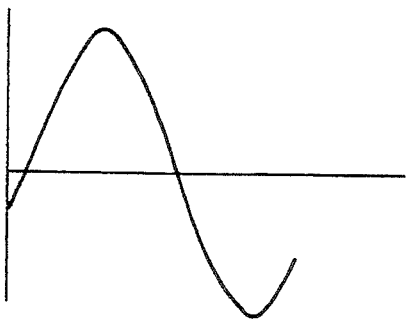

When the vibratory gyroscope 12 is bent and vibrated, if a drift component exists, as shown in FIG. 3, a phase difference is generated between the output signals of the piezoelectric elements 16a and 16b. Though an amplitude of the vibrating body 14 is detected and a feedback signal for feedback to the oscillation circuit 34 is obtained by the piezoelectric element 16c, a phase shifting is generated between the output signals of the piezoelectric elements 16a, 16b and the feedback signal by capacitance of the piezoelectric elements 16a–16c, impedance of signal source, impedance of load and so on.

By the first differential amplifier circuit 38, the difference between the output signals of the piezoelectric elements 16a, 16b is obtained. The output signal is a composite signal composed of the Coriolis signal by the Coriolis force generated by rotating the vibratory gyroscope 12 and the drift signal. The Coriolis signal has the same phase as the feedback signal obtained from the piezoelectric element 16c for feedback has. The drift signal is a signal obtained by the phase difference between the output signals of the piezoelectric elements 16a and 16b. By the summing circuit 46, a sum of the output signals of the piezoelectric elements 16a and 16b is obtained. The output signal has a phase difference of 90 degree from the drift signal, when the output signals of the piezoelectric elements 16a, 16b obtained from the first differential circuit 38 are the same amplitude.

Figure 4:
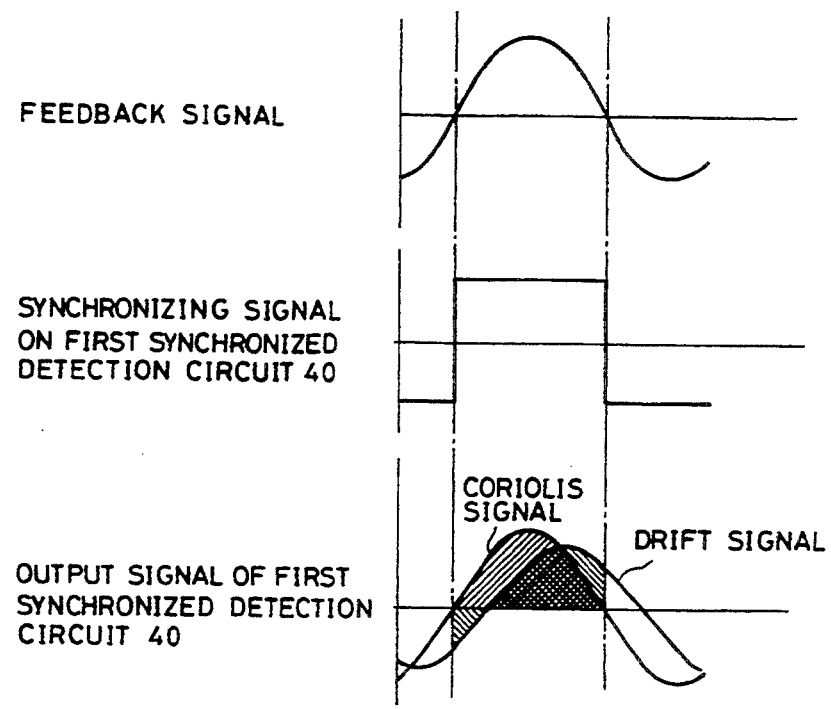
FIG. 4 is a wave form diagram showing a state wherein an output signal of a first differential amplifier circuit is detected in synchronous with a feedback signal.

By the first synchronized detection circuit 40, as shown in FIG. 4, the output signal of the first differential amplifier circuit 38 is detected in synchronous with the feedback signal of the vibratory gyroscope 12. In this case, the synchronizing signal having a phase difference of 90 degree from the feedback signal is given to the first synchronized circuit 40, the signal is synchronously detected according to the synchronizing signal. And, the signal synchronously detected is smoothed by the first smoothing circuit 44. Since the Coriolis signal has the same phase as the feedback signal has, the detected Coriolis signal is obtained 100%. On the other hand, since the drift signal has a phase difference from the Coriolis signal, the positive portion and the negative portion are offset, the drift signal is obtained, for example, 60%.

Figure 5:
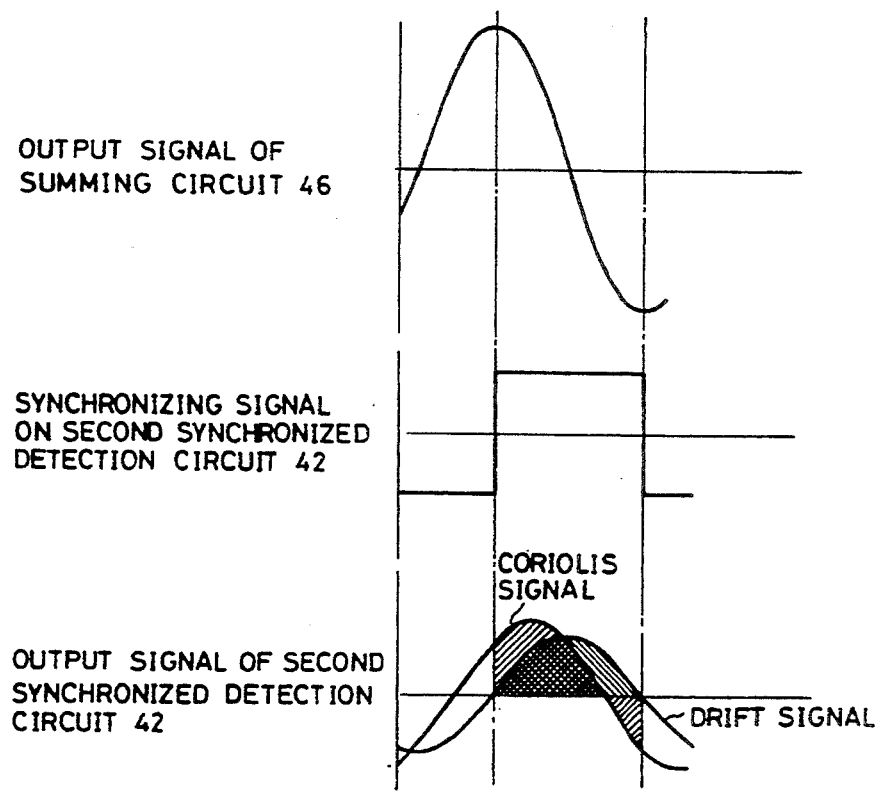
FIG. 5 is a wave form diagram showing a state wherein the output signal of the first differential amplifier circuit is detected in synchronous with an output signal of a phase correction circuit.

By the second synchronized detection circuit 42, as shown in FIG. 5, the output signal of the first differential amplifier circuit 38 is detected in synchronous with the output signal of the phase correction circuit 48. In this case, the synchronizing signal having a phase difference of 90 degree from the output signal of the summing circuit 46 is applied to the second synchronized detection circuit 42, the signal is synchronously detected according to the synchronizing signal. And, the signal synchronously detected is smoothed by the second smoothing circuit 50. Since the drift signal has a phase difference of 90 degree from the output signal of the summing circuit 46, the drift signal is obtained 100%. On the other hand, since the Coriolis signal has a phase difference from the drift signal, the positive portion and the negative portion are offset, the Coriolis signal is obtained, for example, 60%.

The output signal of the second smoothing circuit 50 is adjusted in level by the level adjusting circuit 52, and its level is adjusted to the level of the drift signal included in the output signal of the first smoothing circuit 44. In the embodiment, the output signal of the second smoothing circuit 50 is amplified by 0.6, thereby its level has the same level as the drift signal included in the output signal of the first smoothing circuit 44 has. Thus, the output signal of the second differential amplifier circuit 54 does not include the drift signal.

Since the output signal of the second smoothing circuit 50 includes 60% of the Coriolis signal, by 0.6 times it, 36% of the Coriolis signal is obtained from the level adjusting circuit 52. Thus, the difference between the output signal of the first smoothing circuit 44 and the output signal of the level adjusting circuit 52 includes 64% of the Coriolis signal. When the gain of the second differential circuit 54 is set at 1.56 times, the Coriolis signal can be taken out approximate 100%. Accordingly, when using the above method, since the drift component can be eliminated, the rotational angular velocity can be detected accurately.

As a method for adjusting a level by the level adjusting circuit 52, the temperature may be changed without rotating the vibratory gyroscope 12, and it may be adjusted so that the output signal of the second differential amplifier circuit 54 is zeroed. Though the capacitance of the piezoelectric elements 16a–16c changes by the temperature changing also the phase difference between the output signals of piezoelectric elements 16a and 16b changes, it is possible to follow the phase difference changing, by detecting in synchronous with a signal shifted the output signal of the summing circuit 46 by 90 degree. Thus, even if the temperature changes, the drift component can be eliminated by using the method for detecting. Also, when using the method for detecting, it is able to follow a shifting between the resonance frequencies of the piezoelectric elements 16a and 16b, and the rotational angular velocity can be detected accurately.

Figure 6:
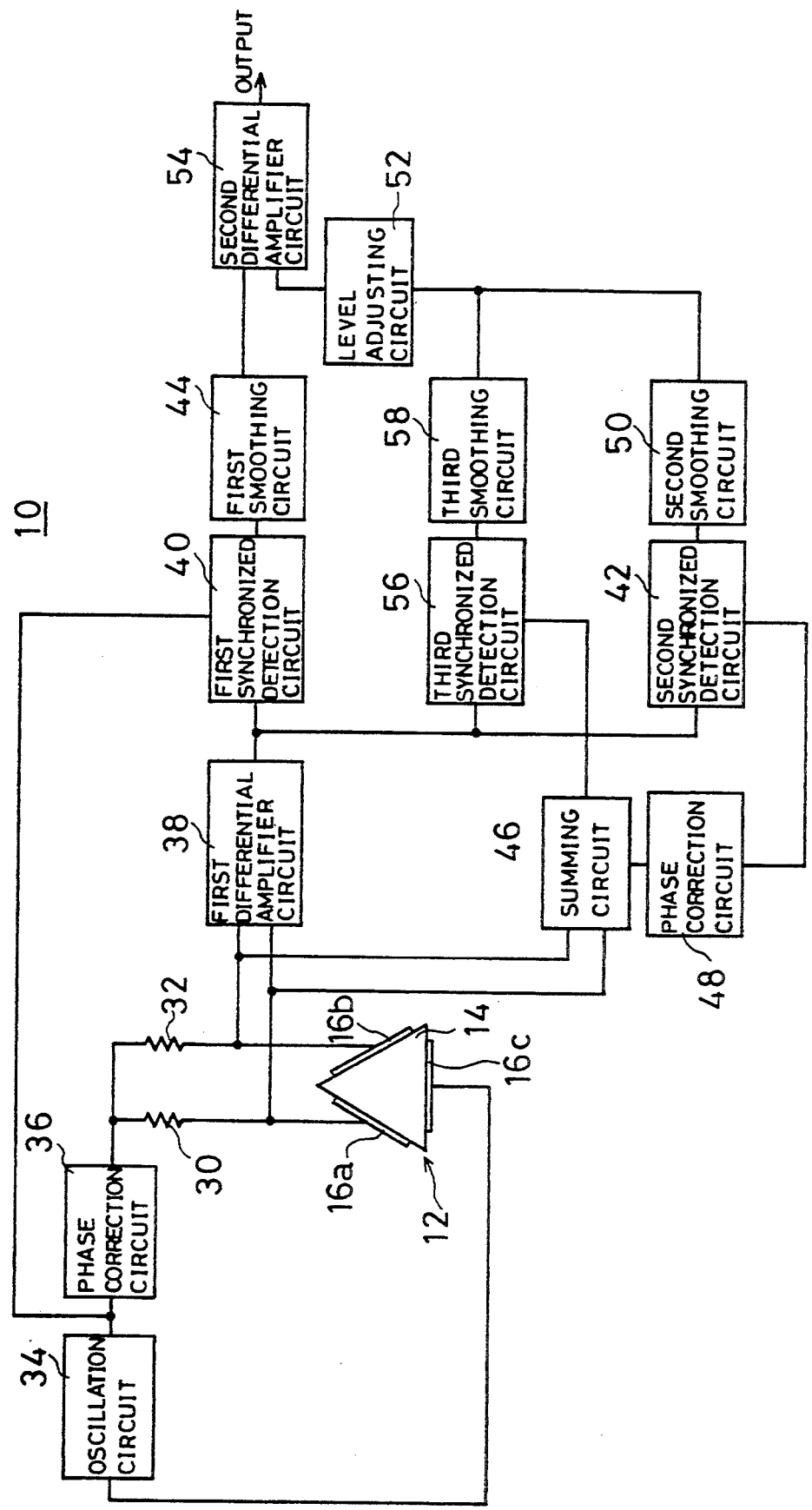
FIG. 6 is a block diagram showing another example of a detecting circuit used in a method for detecting an output of a gyroscope according to the present invention.

When a level difference is generated between the output signals of the piezoelectric elements 16a, 16b of the vibratory gyroscope 12 at non-rotating, a drift signal by the level difference can be eliminated by using the detecting circuit 10 shown in FIG. 6, too. In the detecting circuit 10, furthermore, the output signal of the differential amplifier circuit 38 is applied to a third synchronized detection circuit 56. By the third synchronized detection circuit 56, the output signal of the first differential amplifier circuit 38 is detected in synchronous with the output signal of the summing circuit 46. An output signal of the third synchronized detection circuit 56 is smoothed by a third smoothing circuit 58. And, an output signal of the third smoothing circuit 58 is applied to the level adjustment circuit 52.

When only a level difference is generated between the output signals of the piezoelectric elements 16a, 16b, as shown in FIG. 7, the differential output thereof that is the drift signal and the output signals of the piezoelectric elements 16a, 16b are the same phase. When a phase difference is generated between the output signals as shown in FIG. 8, the differential output has a phase difference of 90 degree from the summing output as aforementioned. When a rotational angular velocity is detected by the vibratory gyroscope 12, between the output signals of the piezoelectric elements 16a, 16b, as shown in FIG. 9, a level difference and a phase difference are generated by a direction and a magnitude of the rotational angular velocity. Though the differential output between the signals can be obtained, a point generated the Coriolis signal can be controlled by changing terminal impedance of the vibratory gyroscope 12 or the resonance frequency at detecting system. Thus, when the detecting circuit 10 is used, the point generated the Coriolis output is set, for example, within 90 degree from the point generated the output of the summing circuit 46. In the embodiment, the point generated the Coriolis signal is set at approximate 45 degree from the point generated the output of the summing circuit 46.

Figure 11:
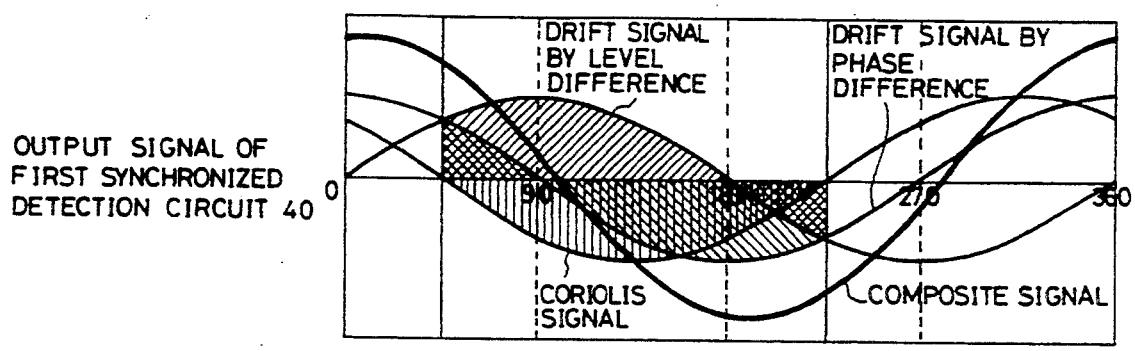
FIG. 11 is a wave form diagram showing a state wherein an output signal of the first differential amplifier circuit is detected in synchronous with the feedback signal.

Therefore, as shown in FIG. 10, the output signal of the first differential amplifier circuit 38 includes the Coriolis signal, the drift signal by the level difference and the drift signal by the phase difference. By the first synchronized detection circuit 40, similarly the embodiment shown in FIG. 1, the output signal of the first differential amplifier circuit 38 is detected in synchronous with the synchronizing signal which has the same phase as the feedback signal of the vibratory gyroscope 12 has. From the first synchronized detection circuit 40, as shown in FIG. 11, one side polar portion of the Coriolis signal is obtained 100%. Regard to the drift signals by the level difference and the phase difference, the positive portion and the negative portion are respectively obtained. Thus, when the output signal of the first synchronized detection circuit 40 is smoothed by the first smoothing circuit 44, though the Coriolis signal is obtained 100%, the positive portion and the negative portion of each drift signal are offset, thereby, for example, only 50% of each drift signal is obtained.

Figure 12:
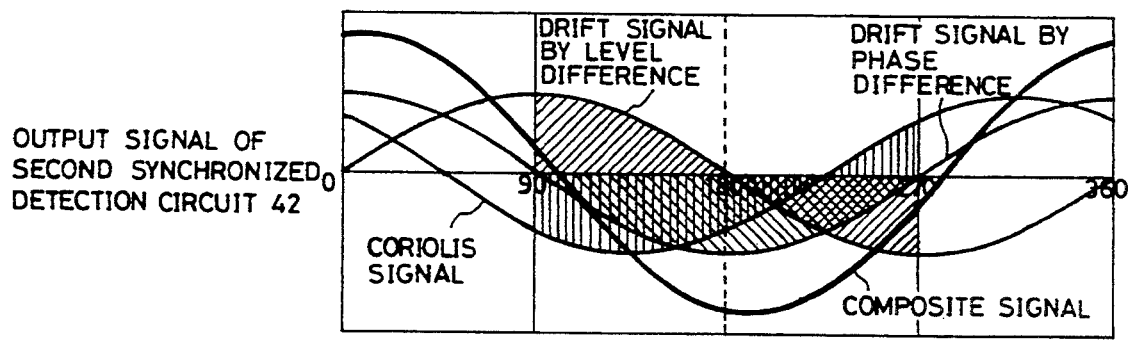
FIG. 12 is a wave form diagram showing a state wherein the output signal of the first differential amplifier circuit is detected in synchronous with an output signal of the phase correction circuit.

By the second synchronized detection circuit 42, similarly the embodiment shown in FIG. 1, the output signal of the first differential amplifier circuit 38 is detected in synchronous with the output signal of the phase correction circuit 48. From the second synchronized detection circuit 42, as shown in FIG. 12, one side polar portion of the drift signal by the phase difference is obtained 100%. Regard to the Coriolis signal, the positive portion and the negative portion are obtained. Regard to the drift signal by the level difference, the positive portion and the negative portion are obtained at the same ratio. Thus, when the output signal of the synchronized detection circuit 42 is smoothed by the second smoothing circuit 50, though the drift signal by the phase difference is obtained 100%, the positive portion and the negative portion of the Coriolis signal are offset, thereby, for example, only 50% of the Coriolis signal is obtained. The positive portion and the negative portion of the drift signal by the level difference are almost offset, thereby, the drift signal by the level difference is not obtained.

Figure 13:
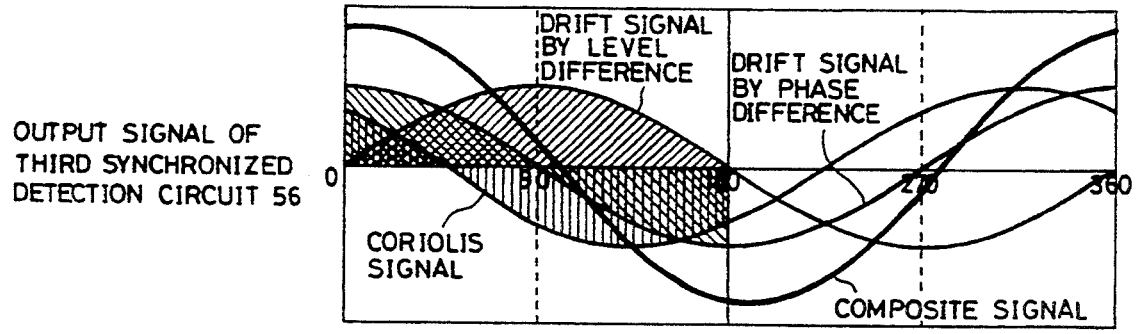
FIG. 13 is a wave form diagram showing a state wherein an output signal of the first differential amplifier circuit is detected in synchronous with an output signal of a summing circuit.
Figure 14:
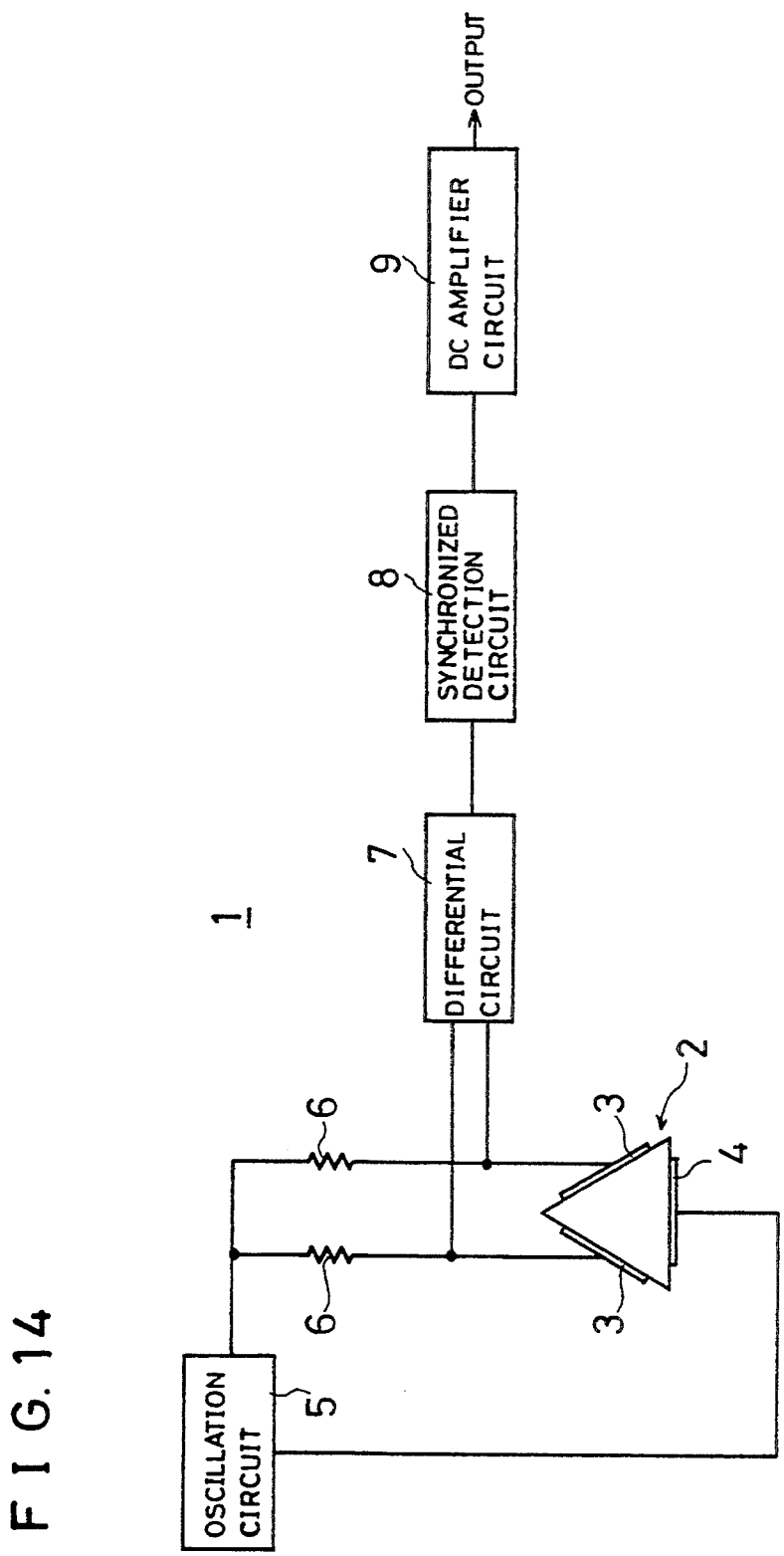
FIG. 14 is a block diagram showing an example of a detecting circuit used in a conventional method for detecting an output of a gyroscope which is a background of the present invention.

By the third synchronized detection circuit 56, the output signal of the first differential amplifier circuit 38 is detected in synchronous with the output signal of the summing circuit 46. From the third synchronized detection circuit 56, as shown in FIG. 13, one side polar portion of the drift signal by the level difference is obtained 100%. Regard to the Coriolis signal, the positive portion and the negative portion are obtained. Regard to the drift signal by the phase difference, the positive portion and the negative portion are obtained at the same ratio. Thus, when the output signal of the third synchronized detection circuit 56 is smoothed by the third smoothing circuit 58, though the drift signal by the level difference is obtained 100%, the positive portion and the negative portion of the Coriolis signal are offset, thereby, for example, only 50% of the Coriolis signal is obtained. The positive portion and the negative portion of the drift signal by the phase difference are almost offset, thereby, the drift signal by the phase difference is not obtained.

The output signals of the second smoothing circuit 50 and the third smoothing circuit 58 are adjusted in level by the level adjusting circuit 52, and each level is adjusted to the level of each drift signal included in the output signal of the first smoothing circuit 44. In the embodiment, the output signals of the second smoothing circuit 50 and the third smoothing circuit 58 are amplified by 0.5, thereby each level has the same level as each drift signal included in the output signal of the first smoothing circuit 44 has. Thus, the output signal of the second synchronized amplifier circuit 54 does not include the drift signals by the level difference and the phase difference.

Since the output signals of the second smoothing circuit 50 and the third smoothing circuit 58 include 50% of the Coriolis signal respectively, by 0.5 times them and by summing, 50% of the Coriolis signal is obtained from the level adjusting circuit 52. Thus, the difference between the output signal of the first smoothing circuit 44 and the output signal of the level adjusting circuit 52 includes 50% of the Coriolis signal. When the gain of the second differential amplifier circuit 54 is doubled, the Coriolis signal can be taken out 100%. Accordingly, when using the method, since the drift components by the level difference and the phase difference can be eliminated, the rotational angular velocity can be detected accurately.

In each aforementioned embodiment, though the detection circuit 10 is used for detecting the output of the regular triangular prism-shaped vibratory gyroscope, it is usable for another prism-shaped vibratory gyroscope for example a square prism-shaped or a circular prism-shaped vibratory gyroscope wherein a difference between output signals of two piezoelectric elements is detected. It is usable for detecting an output of a vibratory gyroscope wherein electrodes are formed on a surface of a prism-shaped vibrating body consisting of piezoelectric ceramics. In this case, two electrodes formed on the surface of the vibrating body are used as detecting members.

It will be apparent from the foregoing that, while the present invention has been described in detail and illustrated, these are only particular illustrations and examples, and the present invention is not limited to these.

The spirit and scope of the present invention is limited only by the appended claims.

What is claimed is:

1. A method for detecting an output of a gyroscope for measuring an output of a vibratory gyroscope including a prism-shaped vibrating body and two detecting members formed on a surface of said vibrating body comprising:

a step for detecting a difference between output signals of said two detecting members by a differential circuit;

a step for detecting a sum of the output signals of said two detecting members by a summing circuit;

a step for shifting an output signal of said summing circuit by 90 degree by a phase correction circuit;

a step for detecting an output signal of said differential circuit in synchronous with a Coriolis detecting signal of said vibratory gyroscope by a first synchronized detection circuit;

a step for detecting the output signal of said differential circuit in synchronous with an output signal of said phase correction circuit by a second synchronized detection circuit;

a step for smoothing an output signal of said first synchronized detection circuit by a first smoothing circuit;

a step for smoothing an output signal of said second synchronized detection circuit by a second smoothing circuit; and a step for eliminating a drift component by composing an output signal of said first smoothing circuit and an output signal of said second smoothing circuit with adjusting a level thereof.

2. A method for detecting an output of a gyroscope according to claim 1, wherein said step for eliminating the drift component includes a step for adjusting the level of the output signal of said second smoothing circuit by a level adjusting circuit.

3. A method for detecting an output of a gyroscope according to claim 2, wherein said step for eliminating the drift component includes a step for detecting a difference between the output signal of said first smoothing circuit and an output of said level adjusting circuit by another differential circuit.

4. A method for detecting an output of a gyroscope for measuring an output of a vibratory gyroscope including a prism-shaped vibrating body and two detecting members formed on a surface of said vibrating body comprising:

a step for detecting a difference between output signals of said two detecting members by a differential circuit;

a step for detecting a sum of the output signals of said two detecting members by a summing circuit;

a step for shifting an output signal of said summing circuit by 90 degree by a phase correction circuit;

a step for detecting an output signal of said differential circuit in synchronous with a Coriolis detecting signal of said vibratory gyroscope by a first synchronized detection circuit;

a step for detecting the output signal of said differential circuit in synchronous with an output signal of said phase correction circuit by a second synchronized detection circuit;

a step for detecting the output signal of said differential circuit in synchronous with the output signal of said summing circuit by a third synchronized detection circuit;

a step for smoothing an output signal of said first synchronized detection circuit by a first smoothing circuit;

a step for smoothing an output signal of said second synchronized detection circuit by a second smoothing circuit;

a step for smoothing an output signal of said third synchronized detection circuit by a third smoothing circuit; and a step for eliminating a drift component by composing an output signal of said first smoothing circuit, output signals of said second smoothing circuit and said third smoothing circuit with adjusting levels thereof.

5. A method for detecting an output of a gyroscope according to claim 4, wherein said step for eliminating the drift component includes a step for adjusting the levels of the output signals of said second smoothing circuit and said third smoothing circuit by a level adjusting circuit.

6. A method for detecting an output of a gyroscope according to claim 5, wherein said step for eliminating the drift component includes a step for detecting a difference between the output signal of said first smoothing circuit and an output signal of said level adjusting circuit by another differential circuit.

* * * * *